(12) United States Patent
Poulbot et al.

(10) Patent No.: US 6,958,615 B2
(45) Date of Patent: Oct. 25, 2005

(54) METHOD AND DEVICE FOR EVALUATING DEFORMATIONS AND FORCES

(75) Inventors: Valéry Poulbot, Les Martres d'Artiere (FR); Lionel Fagot-Revurat, Ussel de Vensat (FR); Heathcliff Demaie, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 12 days.

(21) Appl. No.: 10/614,329

(22) Filed: Jul. 8, 2003

(65) Prior Publication Data

US 2004/0004486 A1  Jan. 8, 2004

Related U.S. Application Data

(63) Continuation of application No. PCT/EP02/00180, filed on Jan. 10, 2002.

(30) Foreign Application Priority Data

Jan. 10, 2001  (FR) .................................. 01 00353

(51) Int. Cl.$^7$ ....................... G01R 27/26; G01R 31/08; B60C 23/06
(52) U.S. Cl. ....................... 324/661; 324/515; 73/146.5
(58) Field of Search .............................. 324/661, 662, 324/658, 671, 686, 690, 515, 517; 361/283.1; 177/210 C; 73/146.5

(56) References Cited

U.S. PATENT DOCUMENTS

| | | | | |
|---|---|---|---|---|
| 4,102,422 A | * | 7/1978 | Christiansson | .......... 177/210 C |
| 4,266,263 A | * | 5/1981 | Haberl et al. | ............. 361/283.2 |
| 4,510,436 A | * | 4/1985 | Raymond | .................... 324/690 |
| 4,578,992 A | * | 4/1986 | Galasko et al. | ............. 73/146.5 |
| 5,731,754 A | * | 3/1998 | Lee et al. | .................... 340/447 |
| 5,974,856 A | * | 11/1999 | Elie et al. | .................. 73/11.04 |
| 6,543,279 B1 | * | 4/2003 | Yones et al. | ............... 73/146.5 |
| 6,606,911 B2 | * | 8/2003 | Akiyama et al. | .......... 73/146.5 |

FOREIGN PATENT DOCUMENTS

| DE | 35 03 805 A1 | 8/1986 |
|---|---|---|
| EP | 0 756 162 A2 | 1/1997 |

* cited by examiner

*Primary Examiner*—Anjan Deb
(74) *Attorney, Agent, or Firm*—Buchanan Ingersoll PC

(57) ABSTRACT

A method and a device for evaluating the deformations or forces to which a structure having an elastomeric body (2) is subjected. The device includes a dipole (6), the dielectric (3) of which is formed by the elastomeric body, and an electronic analyzing circuit sensitive to a variation of a capacitive characteristic of the dipole caused by the deformations of the elastomeric body. In particular, but not exclusively, the invention relates to a device for evaluating the forces to which a pneumatic tire is subjected when rolling, as it passes through the contact area. The invention applies similarly in other structures having an elastomeric body, such as, for example, the elastomeric joints intended for the chassis system of vehicles.

21 Claims, 9 Drawing Sheets

METHOD AND DEVICE FOR EVALUATING DEFORMATIONS AND FORCES

This application is a continuation of Application No. PCT/EP02/00180, filed on Jan. 10, 2002.

The present invention relates to the chassis system of motor vehicles and in particular to the information relating to the forces which are exerted between the vehicle and the ground or between the various elements of the chassis system.

The chassis system of motor vehicles consists of a chain of elements or structures linking the vehicle body to the ground on which the vehicle moves. Within this chain, the following elements or structures may be identified: the pneumatic tire, the wheel, the hub, the hub carrier, the ball joints, the pivots, the suspension arms or wishbones, the elastomeric joints or bushings, the springs, the shock absorbers. These elements or structures transmit to the body the forces to which the pneumatic tire is subjected in the contact area. These elements or structures are deformable to a greater or lesser extent, that is to say they deform to a greater or lesser extent when a given force is transmitted by the chain. If the forces transmitted by the chain are to be ascertained, they may be deduced theoretically from the deformations of each element of the chain. It is, for example, known to measure the forces in the suspension arms with the aid of deformation gauges, the electric resistance of which varies as a function of the deformation to which the arms are subjected. The present invention proposes to utilise the fact that the deformation is more sensitive and/or more significant in certain elements of the chassis system. This is the case of the pneumatic tires or elastomeric joints. The reason for this is that these elements consist largely of an elastomeric material, generally rubber, so that their rigidity is much lower than that of the other elements of the chain, which are generally metal.

According to a further characteristic of the invention, the measurement of a capacitive electrical characteristic of at least one electric dipole, the dielectric of which consists of an elastomeric body subjected to the deformations of the structure, is used.

The fact that the variation of a capacitive characteristic is used permits, in particular, a measurement with a low energy consumption. This is particularly beneficial with regard to a power supply of the device which may be effected, for example, by a small-size battery or by remote supply.

The invention therefore relates to a device for evaluating deformations of a structure comprising an elastomeric body and intended to belong to the chassis system of a vehicle, the said device comprising an electric dipole, the dielectric of which is formed by the said elastomeric body and an electronic analysing circuit sensitive to a variation of a capacitive characteristic of the dipole caused by the said deformations of the said body.

The device of the invention may also further comprise means for evaluating forces to which the said structure is subjected as a function of the said deformations caused by the said forces.

Preferably, the dipole comprises filar electrodes which are substantially parallel.

The device of the invention may be employed in a pneumatic tire.

The invention also relates to a pneumatic tire including at least one such device. According to a first embodiment, the dipole is situated in the thickness of the tread and preferably in the volume of a tread pattern element. The dielectric of the dipole may advantageously consist of the material which constitutes the tread at least in the zone in which it is situated. The electrodes of the dipole are preferably filar, substantially perpendicular to the longitudinal direction of the tread and substantially parallel to the transverse direction of the tread in order to evaluate the longitudinal deformations. In contrast, in order to evaluate the transverse deformations, the filar electrodes of the dipole are preferably substantially perpendicular to the transverse direction of the tread and substantially parallel to the longitudinal direction of the tread. In these configurations, the electrodes are preferably situated substantially in the same radial plane of the tread. The said device may also comprise at least three electrodes which, between them, constitute at least two dipoles.

According to another embodiment of the invention, the device comprises two filar electrodes situated in a zone of the tread which is not intended to come into contact with the ground when the pneumatic tire is rolling, for example between two tread blocks.

According to yet another embodiment of the invention, the device is situated in a sidewall of the pneumatic tire and the dielectric preferably consists of the elastomeric material which constitutes the sidewall at least in the zone in which it is situated. In the sidewall, the electrodes are substantially parallel and oriented substantially radially. The electrodes may, for example, be situated substantially at the same distance from the centre plane of the pneumatic tire or be spaced from one another in the direction of the thickness of the sidewall, depending on the type of deformations to which it is desired that the device is most sensitive.

The electrodes may consist of interdigitated combs in order to improve the quality of the signal.

The pneumatic tire according to the invention may comprise a plurality of dipoles arranged along the circumference of the sidewall and connected to one another in parallel to form a single dipole.

The invention also relates to an elastomeric joint, in particular intended for the chassis system of a vehicle, comprising at least one such evaluating device.

The invention also relates to a method for evaluating deformations of a structure comprising an elastomeric body, consisting in deducing the said deformations from variations of a capacitive characteristic of at least one dipole, the dielectric of which is formed by the said elastomeric body.

The invention also relates to a method for evaluating the forces to which a structure comprising an elastomeric body is subjected, the said method consisting in evaluating the said forces from deformations of the said body caused by the said forces, the resistivity of the said body being greater than $10^{13}$ $\Omega$.cm, the said method being characterised in that the said deformations are deduced from variations of a capacitive characteristic of at least one dipole, the dielectric of which is formed by the said elastomeric body.

Depending on their compositions, the elastomeric materials are of greater or lesser conductivity, that is to say they constitute a more or less good dielectric. The more the elastomeric body is a good dielectric, the less the measurement of capacitance or capacitive impedance is affected by the leakage currents from the dipole. This is why a preferred embodiment of the device of the invention uses as dielectric an elastomeric material having a resistivity greater than $10^8$ $\Omega$.cm and preferably even greater than $10^{13}$ $\Omega$.cm. To do this, use is made of an elastomer whose reinforcing filler consists of insulating material, such as, for example, silica, alumina, chalk or starch, in order to limit or eliminate the portion of carbon black conventionally used, since it is a conductor. Moreover, the resultant conductivity of the mixtures filled with carbon black is difficult to ascertain precisely, thereby rendering the measurement of the capacitive characteristic more uncertain.

The capacitive characteristic may be the capacitance which is measured in continuous electrical duty or the capacitive impedance which is measured in dynamic electrical duty.

Thus, the device of the invention allows the forces to which the structure is subjected to be evaluated. This evaluation may be performed by the device itself or by a computing system integrated in the vehicle which uses the deformation measurements resulting from the device of the invention. The signal representing the variation of capacitive characteristic and therefore the deformation of the structure may also be used as it is by a computing system integrated in the vehicle. In fact, the device of the invention is a "sensor" which allows the deformation of a deformable structure to be detected and is capable of processing a signal representing the deformation, this signal being usable by the device itself or by other devices as an input signal in the context, for example, of driving aids (ABS, ASR, ESP, measurement of pneumatic tire pressure, automatic level control, body roll control, etc . . . ).

Preferably, the electrodes of the dipole are substantially parallel filar elements. "Filar elements" are understood to mean elements having a great length compared with the other dimensions, such as, for example, wires, wire bundles, cables, beams, tubes. Consequently, the device is sensitive to deformations mainly in a single direction which is the direction which causes a variation of the distance between the electrodes. Moreover, the rigidity of the dielectric in the direction perpendicular to the axis of a filar element is little affected by the longitudinal rigidity of this filar element.

Preferably, the electrodes are metal and consist of wires or wire arrangements comparable with those which are conventionally used to reinforce the pneumatic tires.

The above-mentioned characteristics of the present invention, as well as others, will be better understood on reading the description of the figures, in which:

FIG. 1 is a schematic sectional view, in a plane parallel to the wheel plane, of part of a tire tread instrumented according to a first embodiment, FIG. 1a is a schematic sectional view, in a plane parallel to the wheel plane, of part of a tire tread instrumented according to a second embodiment, FIG. 1b is a schematic sectional view, in a plane parallel to the wheel plane, of part of a tire tread instrumented according to a third embodiment, FIG. 1c is a schematic sectional view, in a plane parallel to the wheel plane, of part of a tire tread instrumented according to a fourth embodiment, FIG. 2 is a schematic sectional view, in a plane parallel to the wheel plane, of part of a tire tread instrumented according to a variant of the first embodiment, FIG. 2a is a schematic sectional view, in a plane parallel to the wheel plane, of part of a tire tread instrumented according to a variant of the second embodiment, FIG. 2b is a schematic sectional view, in a plane parallel to the wheel plane, of part of a tire tread instrumented according to a variant of the third embodiment, FIG. 2c is a schematic sectional view, in a plane parallel to the wheel plane, of part of a tire tread instrumented according to a variant of the fourth embodiment, FIG. 3 is an experimental graph illustrating the variation of the measured differential capacitance between the two electric dipoles having a common electrode such as that described in FIG. 2c, which are inserted in the tread of a tire when the latter is rolling, in three different situations.

These figures illustrate two main types of instrumentation of a pneumatic tire, in zones of high deformations thereof, the tread and the sidewall, the sensor described being essentially a deformation sensor. The instrumentation of a pneumatic tire according to this methodology is, however, not limited to these two zones.

Figure 1:
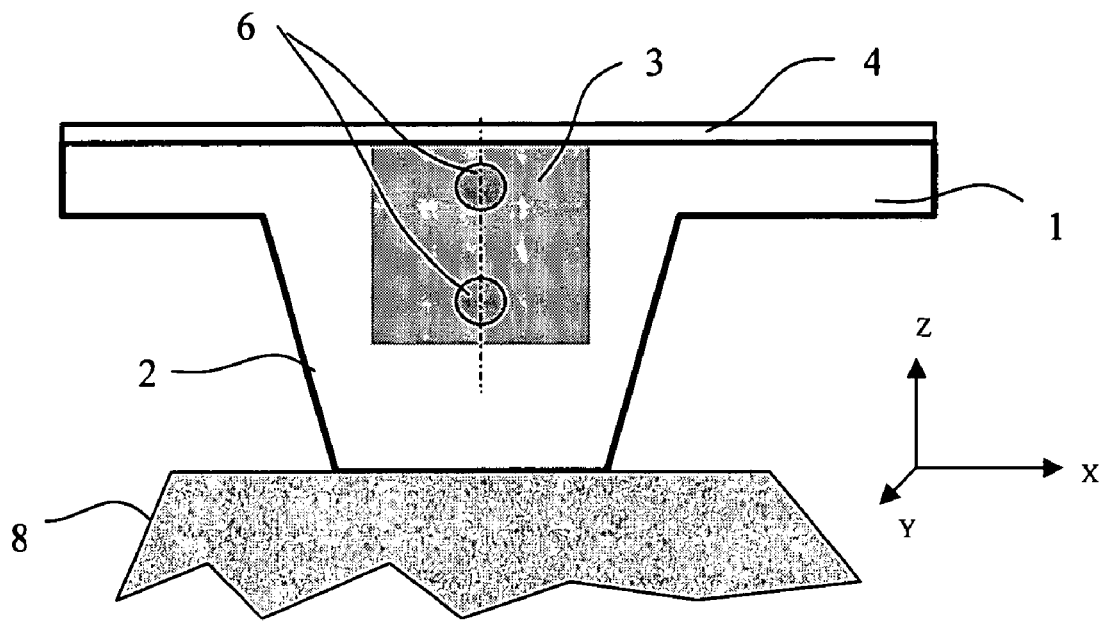

FIG. 1 illustrates a first method of instrumenting the tread of a pneumatic tire according to the invention. The directions are conventionally marked as follows: X is the longitudinal direction of the tread (that is to say the direction of displacement of the pneumatic tire when it is rolling without slipping), Y is the transverse direction of the tread and Z is the direction normal to the plane of the tread in the contact area (that is to say the "radial" direction of the pneumatic tire or vertical direction with respect to the ground.

The tread 1 comprises an insulating elastomeric body 3, filled with silica for example, which is positioned outside of the belt reinforcements 4 and in the volume of a tread block 2. The elastomeric body 3 constitutes the dielectric of an electric dipole. The electrodes of the dipole, which consist of two parallel wires 6, are positioned perpendicularly to the longitudinal direction X of the tread, in the same radial plane YZ. The capacitive characteristics of the dipole thus constituted vary as a function of the deformation of the elastomeric body 3.

When the pneumatic tire is rolling on the ground 8, the tread element 2 is subjected to variable forces. These forces, developed at the interface of the tread element 2 and the ground 8, are transmitted to the inside of the tread 1 and have the effect of deforming the elastomeric body 3. Then, the distance between the wires 6 of the electric dipole varies, which modifies its capacitive electrical impedance or capacitance. The evolution of the capacitive electrical impedance or capacitance of the electric dipole is closely related to the forces developed at the interface between the tread element 2 and the road 8 and this can possibly allow these forces to be evaluated.

Such a spatial arrangement of the filar electrodes 6 which constitute the electric dipole render the capacitive measurement particularly sensitive to shear forces in the rolling direction X. This measurement is not, however, sensitive to the direction of shear deformation in the X direction.

A method of further minimising the sensitivity of the electric dipole to the shear forces developed in the direction Y perpendicular to X consists in dimensioning the filar electrodes 6 in such a way that the ratio of their lengths is substantially different from 1 and that their relative positioning (along the Y axis) is such that the facing length of the electrodes does not vary in the event of shear in the Y direction.

The above-described electric dipole may be positioned no longer perpendicular but parallel to the rolling direction X, in the same plane XZ. Thus, the capacitive measurement between the two filar electrodes 6 becomes particularly sensitive to shear forces developed in the Y direction, and its sensitivity to the shear forces developed in the rolling direction X may be minimised in the same way as before.

Figure 1A:
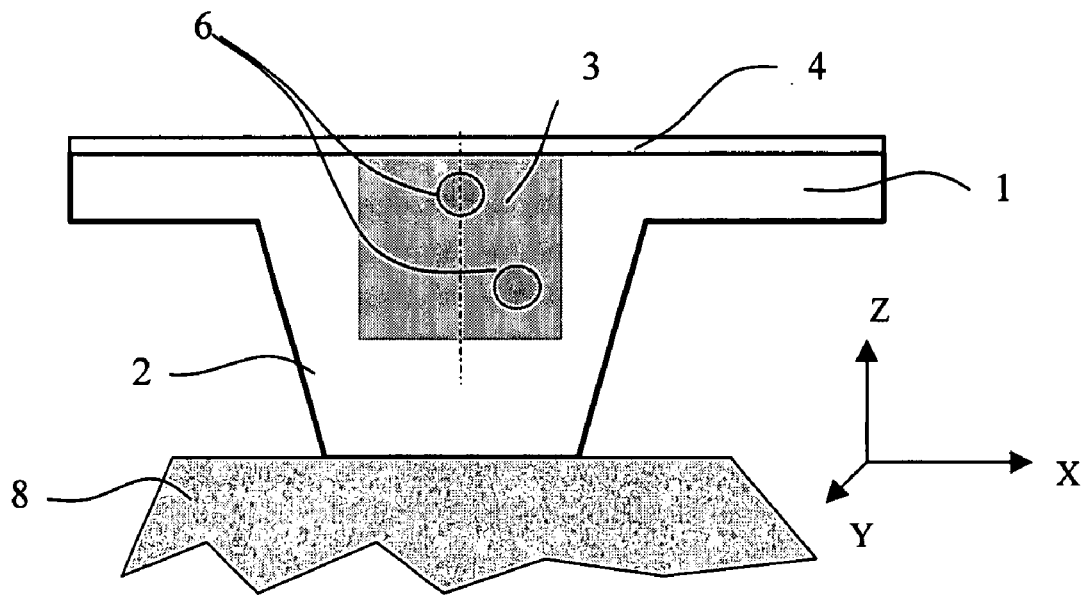

FIG. 1a shows a variant of FIG. 1 in which use has been made of the same elements denoted by the same references. The difference lies in the fact that the filar electrodes 6 are not situated in the same vertical radial plane YZ in the absence of deformation. This spatial arrangement of the filar electrodes 6 has the advantage, over the arrangement described in FIG. 1, of rendering the measurement sensitive to the direction of the shear developed in the X direction (or Y direction for the alternative configuration described in connection with FIG. 1). Indeed, if the initial offset is sufficient, the capacitive characteristic will increase for one shear direction and decrease for a shear of opposite direction. It is understood that the offset is sufficient when it precludes the electrodes from going beyond a vertical alignment whatever the force transmitted. The maximum force is a function of the grip and the load.

Figure 1B:
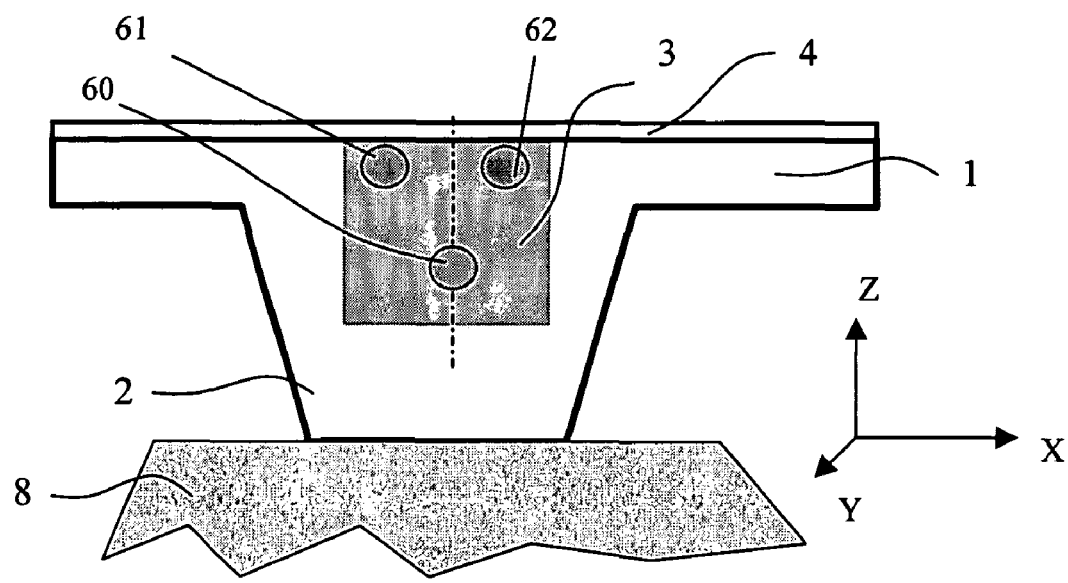

FIG. 1b shows a variant of FIG. 1a in which use has been made of the same elements denoted by the same references. The difference lies in the fact that there are three filar electrodes here. Thus, the elastomeric body 3 contains two electric dipoles which have a common electrode 60. The position of the other two electrodes (61 and 62), belonging to each of the 2 dipoles respectively, is preferably symmetrical with respect to the vertical radial plane YZ passing through the centre of the common electrode 60.

This configuration with three electrodes permits several methods of exploiting the variations of capacitive characteristic. Indeed, it is of course possible to measure the variation of the capacitive characteristic of each dipole to ascertain the deformations and forces to which the rubber element of the tread is subjected, as described above.

However, this configuration furthermore has the consequence, on the one hand, that the difference between the capacitive measurements resulting from the two dipoles is even more sensitive (the sensitivity increases by a factor of at least 2) to the shear deformations in the X direction and, on the other hand, that the sum of these two capacitive measurements is perfectly representative of the compression deformation of the dielectric in the Z direction. This is due to the fact that the effect of compression according to Z is substantially the same for each of the two dipoles, whereas the effect of the shear according to X is substantially opposite for each dipole.

This configuration may therefore advantageously be employed to ascertain the forces according to Z and/or to ascertain with greater precision the shear forces.

These statements are respectively valid when the electrodes of the electric dipole are oriented parallel to the rolling direction X and when the measurement relates to the shear in the transverse direction Y, as described above.

Figure 1C:
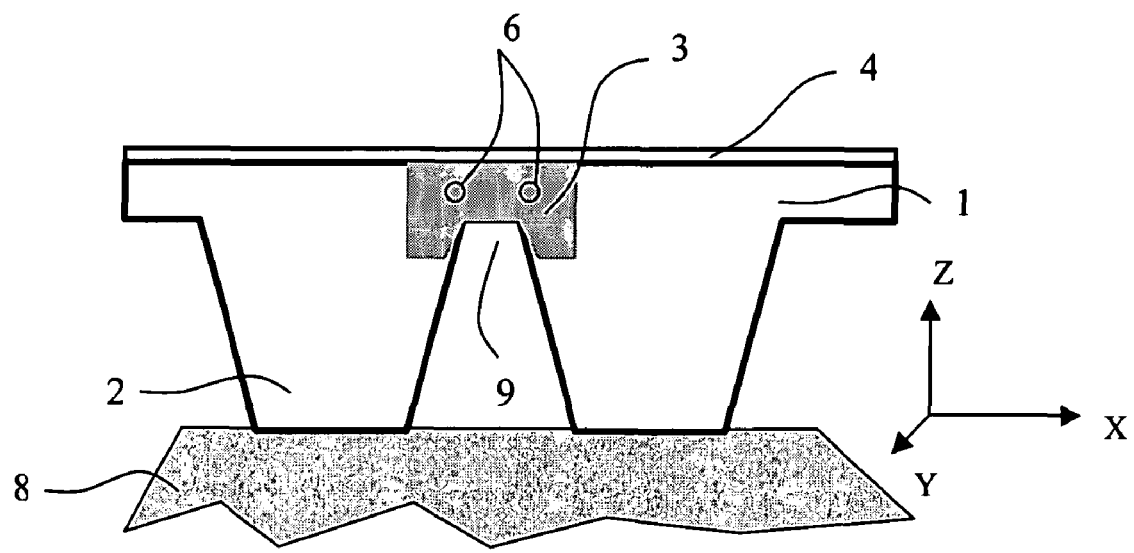

FIG. 1c shows an embodiment of the invention in which the elements of the configuration of FIG. 1 are found again. However, in this embodiment, the dielectric dipole is placed in a groove 9 of the tread 1. And the two electrodes 6 are arranged in a plane XY parallel to the plane of the tread. This configuration is therefore mainly sensitive to extension or compression deformations in the X direction which are associated with the relative deformation of the two adjacent tread elements.

FIGS. 2, 2a, 2b and 2c illustrate variants of the treads shown in FIGS. 1a, 1b and 1c respectively. The elements bear the same references increased by 100 compared with the same elements of said figures. The difference lies in the fact that the elastomeric body which constitutes the dielectric 103 is the same material as that which constitutes the rest of the tread or at least the adjacent parts of the tread. This characteristic may permit a greater cohesion of the pneumatic tire and optimised production when the material employed for the tread possesses the characteristics desired for the dielectric.

Figure 2:
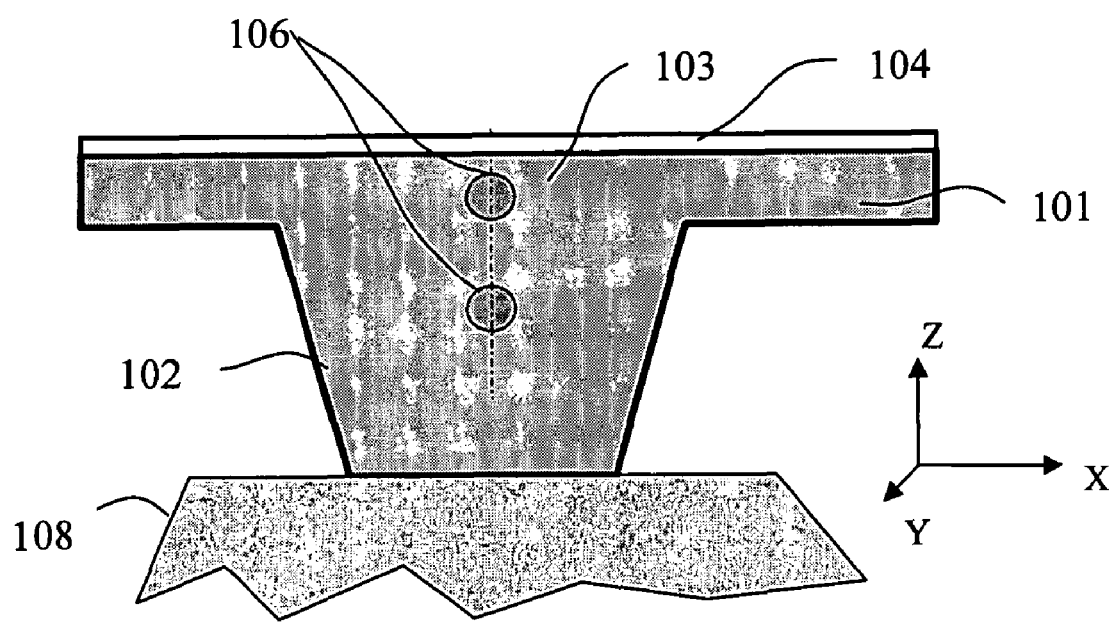
Figure 2A:
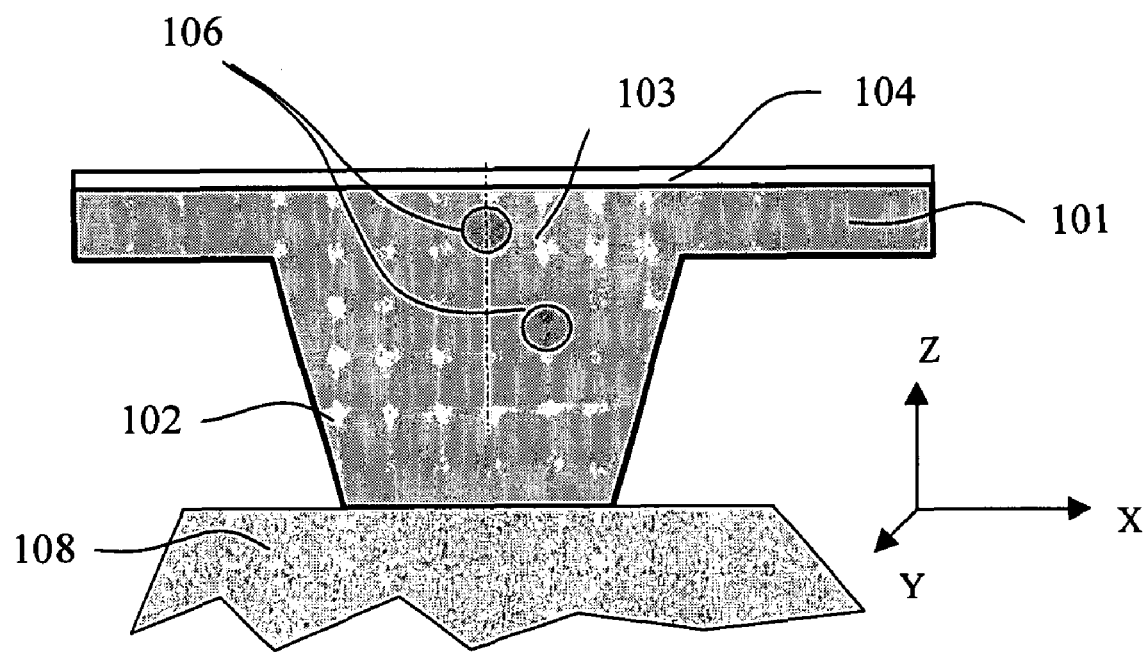
Figure 2B:
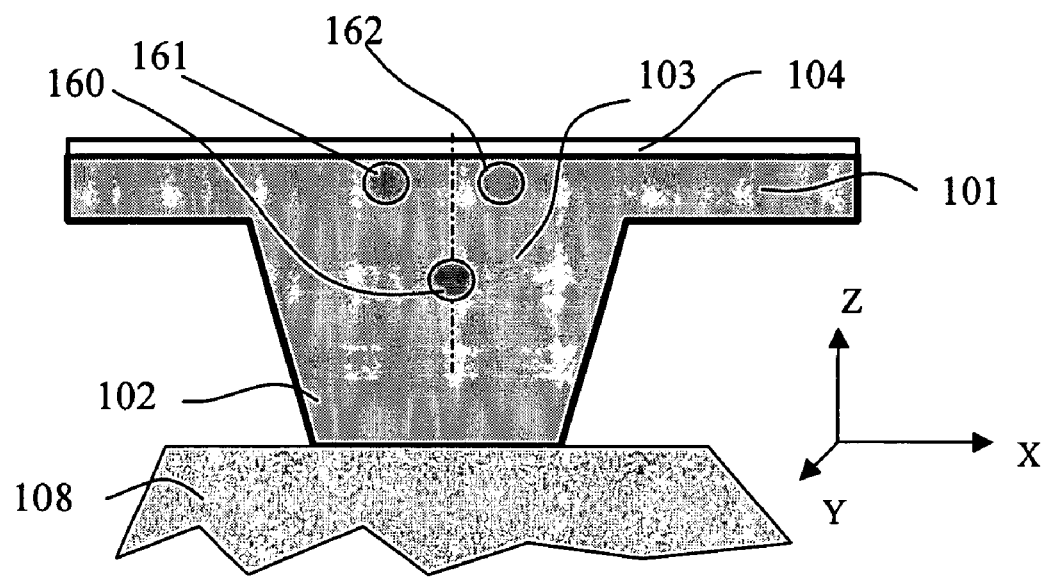
Figure 2C:
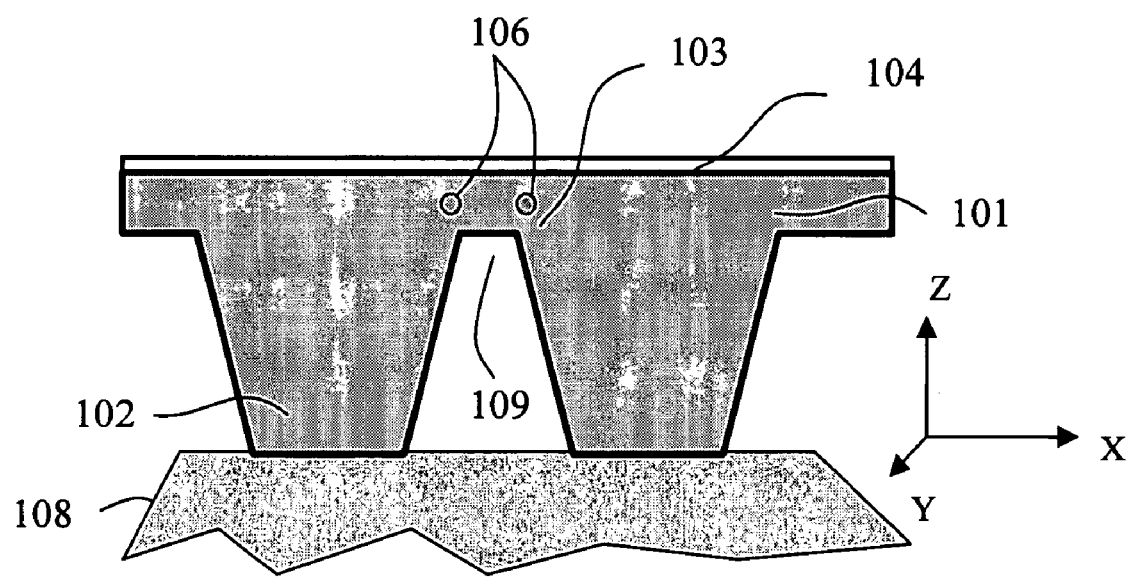
Figure 3:
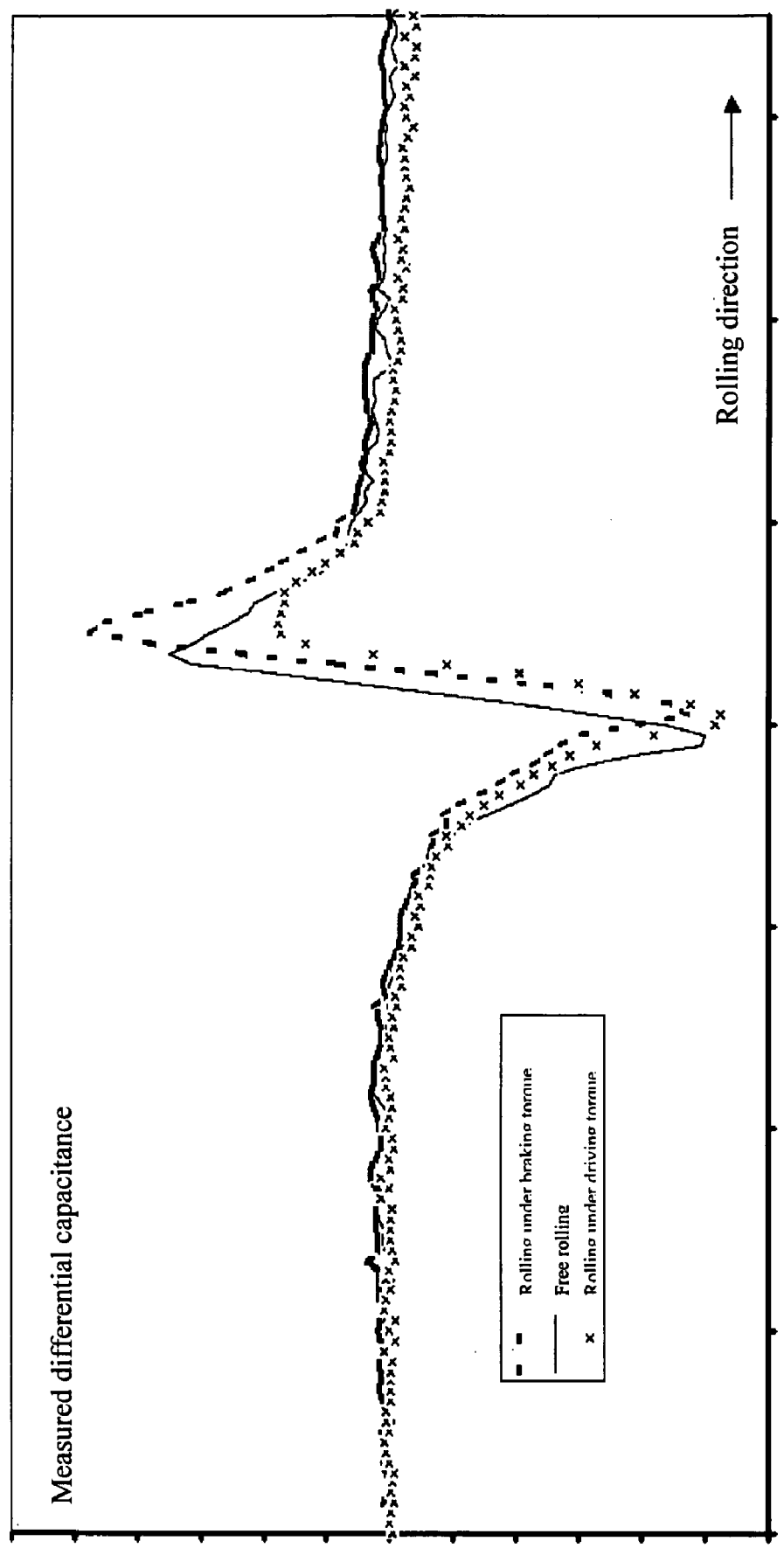

FIG. 3 is an experimental graphical record of the evolution (in the course of the rotation of the pneumatic tire) of the differential capacitive impedance, that is to say the difference between the capacitive impedances of the first and of the second electric dipole, as described in FIG. 2b. The effects of the passage of the sensor through the contact area can be seen in the central part of the graph. The three curves show different rolling situations. The curve in a fine continuous line represents the case of a pneumatic tire which rolls freely under a given load. The curve in a bold dotted line represents the case of the same pneumatic tire rolling under the same load but subjected additionally to a braking torque. Finally, the curve consisting of a succession of crosses represents the case of the same pneumatic tire rolling under the same load but subjected this time to a forward driving torque. This figure indicates well the relationship which exists between the measured electrical characteristic and the forces experienced.

Figure 4:
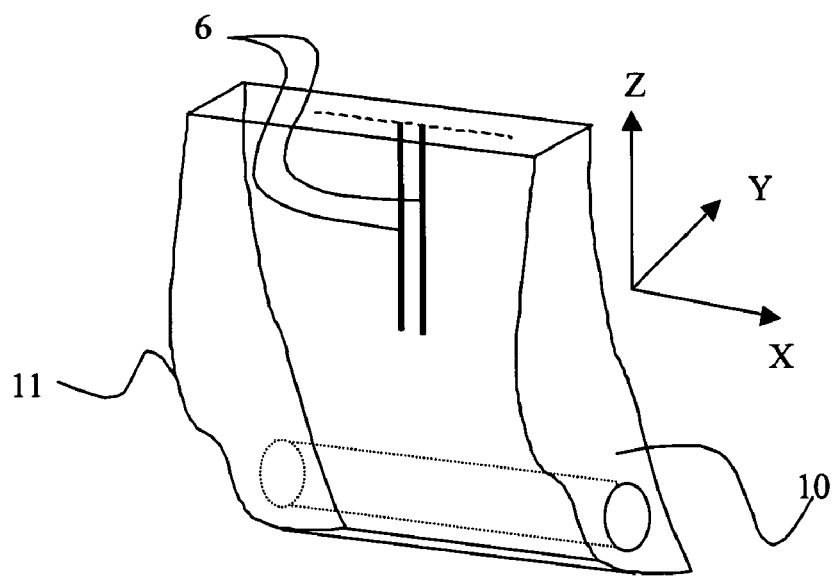
FIG. 4 is a schematic view of a pneumatic tire sidewall instrumented according to a fifth embodiment.

FIG. 4 shows a fifth embodiment of the device of the invention. In this embodiment, the electrodes 6 are arranged in the thickness of a sidewall 10 of a pneumatic tire. The material which constitutes this sidewall is, for example, a sufficiently insulating elastomer. In this embodiment, the filar elements are wires, substantially parallel to each other and to the sidewall and extend along a radius of the pneumatic tire. Each electrode is situated substantially at the same distance from the centre plane of the pneumatic tire. When the pneumatic tire is rolling, the forces transmitted between the vehicle and the ground have the effect of deforming the sidewall 10. The distance between the wires 6 of the electric dipole varies, which modifies its capacitive impedance or capacitance. Analysis of this variation allows the deformations of the sidewall 10 to be evaluated and, for example, the forces transmitted between the vehicle and the road to be evaluated.

The wires hardly disturb the mechanical operation of the pneumatic tire and the evolution of the measured capacitive characteristic is perfectly representative of the circumferential extension of the sidewall.

Figure 4A:
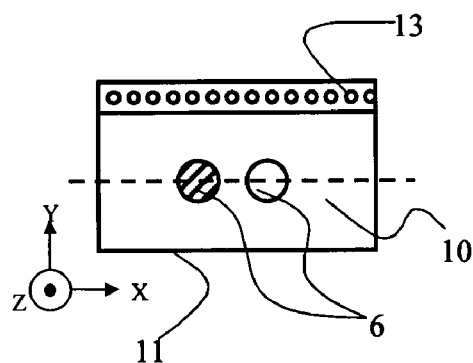
FIG. 4a is a schematic sectional view of a sidewall instrumented according to the fifth embodiment.

The electrodes 6 may be positioned anywhere in the thickness of the sidewall 10. The section of FIG. 4a shows an example in which the electric dipole is positioned outside the carcass reinforcements 13. During the bending of the sidewall, the carcass reinforcements 13 constitute the neutral axis. The farther the dipole is moved away from the latter, the greater are the deformations to which the dielectric is subjected. On the other hand, a positioning in the inner part of the sidewall has the advantage of being better protected from external mechanical stresses and electromagnetic interference. The wires constituting the electrodes 6 of the dipole may also form an integral part of the carcass reinforcements 13.

Figure 4B:
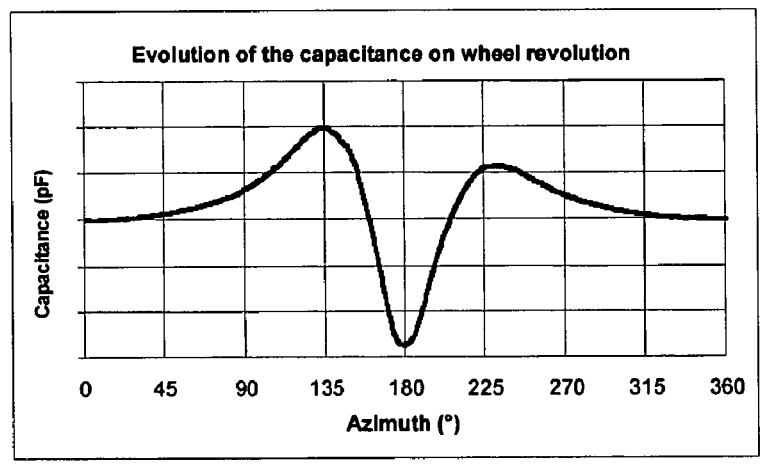
FIG. 4b is an experimental graph illustrating the evolution of the measured capacitance at the terminals of an electric dipole inserted in the sidewall of a tire such as that described in FIG. 4, when the tire is rolling.

FIG. 4b is a graph showing the evolution of the measured capacitance when the pneumatic tire performs a complete revolution in a given load situation.

Figure 5:
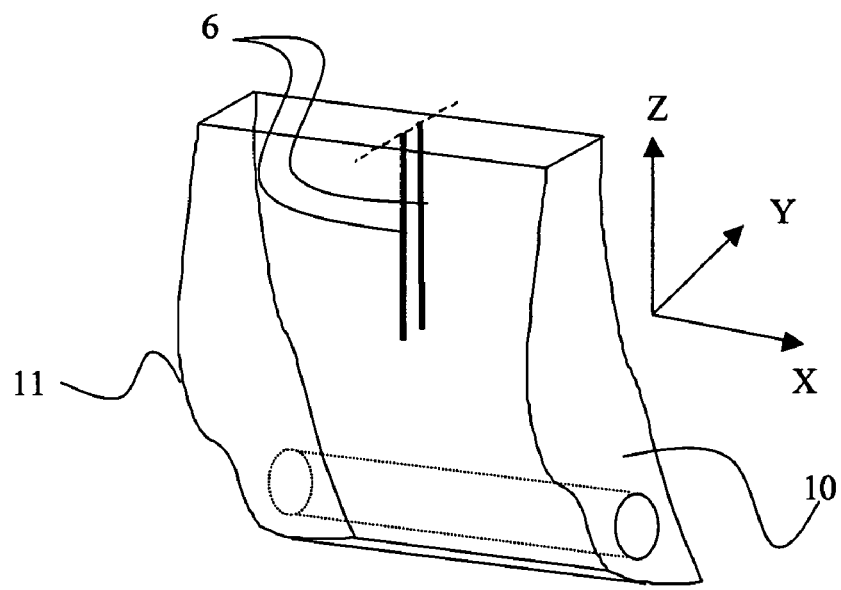
FIG. 5 is a schematic view of a sidewall instrumented according to a sixth embodiment.
Figure 5A:
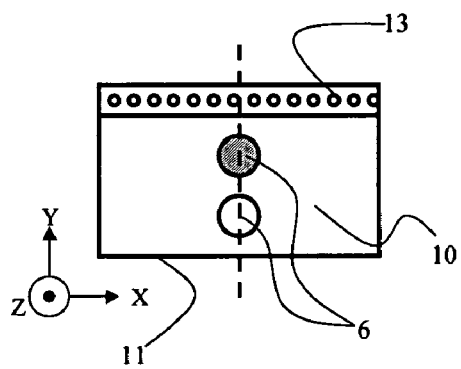
FIG. 5a is a schematic sectional view of a sidewall instrumented according to the sixth embodiment.

FIGS. 5 and 5a illustrate another method of instrumenting the sidewall of a pneumatic tire. The wires 6 which constitute the electric dipole are substantially parallel to each other and to the sidewall, extend radially and are in this case spaced from each other in the direction of the thickness of the sidewall, that is to say the axial direction of the pneumatic tire (are situated therefore in the reference plane YZ of FIGS. 5 and 5a).

In the same way as before, the mechanical operation of the pneumatic tire is hardly disturbed by the presence of these wires. With this configuration, the evolution of the capacitive impedance or capacitance between the wires 6 is representative of the variations of the thickness of the sidewall. The thickness of the sidewall varies in relation to the circumferential extension of the sidewall and its bending in accordance with Poisson's law. The latter governs the deformations of a material in perpendicular directions, as known.

Figure 6:
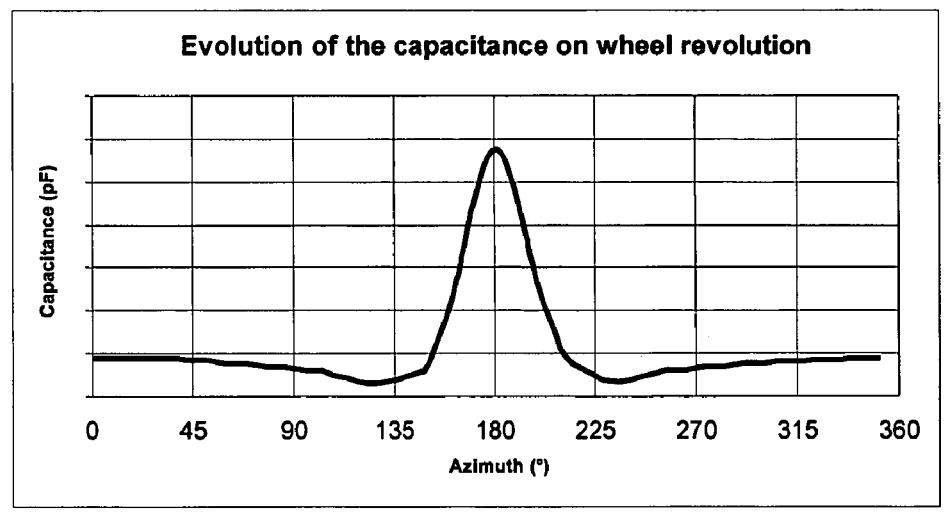
FIG. 6 is an experimental graph illustrating the evolution of the measured capacitance at the terminals of an electric dipole inserted in the sidewall of a tire such as that described in FIG. 5, when the tire is rolling.

FIG. 6 is a graph showing the evolution of the measured capacitance of the electric dipole described in FIG. 5 when the pneumatic tire performs a complete revolution in a given load situation.

Figure 7:
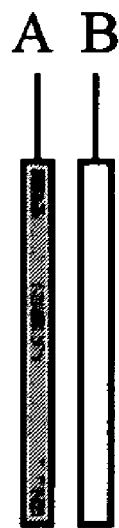
FIG. 7 is a schematic view of an electric dipole configured according to a first arrangement.
Figure 7A:
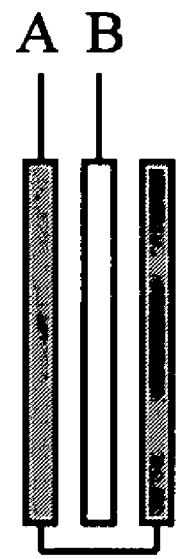
FIG. 7a is a schematic view of an electric dipole configured according to a second arrangement.
Figure 7B:
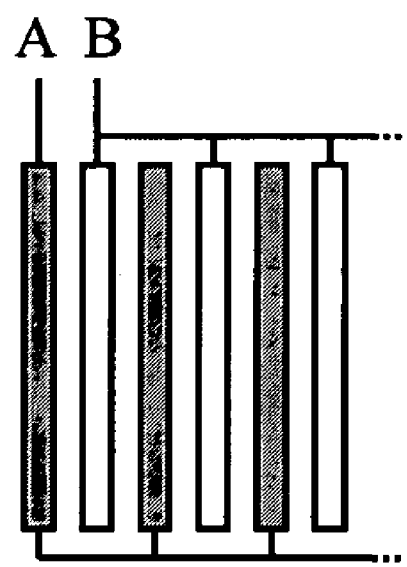
FIG. 7b is a schematic view of an electric dipole configured according to a third arrangement.

It may be advantageous for at least one of the two metal electrodes of the electric dipole to be in the shape of a comb. The metal electrodes 6 are then positioned in such a way that each tooth of one of the electrodes adjoins one or two teeth of the other electrode (interdigitated comb). FIGS. 7, 7a and 7b show variants of this principle. FIG. 7 corresponds to the case where the sensor consists of two simple filar electrodes A and B, as described in the previous figures. FIG. 7a illustrates a second method of building an electric dipole. The electrode A consists of one wire and the electrode B consists of two wires connected to each other (comb with two teeth). The electrode A and the teeth of the electrode B are substantially parallel to each other and the electrode A is placed between the two teeth of the electrode B in the shape of a comb. FIG. 7b illustrates the general method of building an electric dipole. The two electrodes A and B each consist of a plurality of conductors connected to one another, in the shape of a comb. The difference in the number of teeth of the electrodes A and B does not exceed 1, the teeth of the electrodes A and B being placed in such a way that each tooth of one electrode adjoins 1 or 2 teeth of the other electrode and that two neighbouring teeth are substantially parallel to each other.

Particularly in the application to the measurement of the circumferential extension of the sidewall, the use of electrodes in the shape of a comb has at least two advantages. A first advantage is that the variation of capacitive characteristic with the circumferential extension increases (and therefore is potentially more simple to measure) in proportion to the number of teeth of the combs constituting the electric dipole. A second advantage lies in the fact that, since the measurement relates to a more extensive area of the structure, it represents the equivalent of the "average" of several local measurements. This reduces the sensitivity of the device to the dispersion of the local mechanical properties of the pneumatic tire.

The deformations of the instrumented zones of the sidewall of the pneumatic tire take place mainly on passing through the contact area. It may be beneficial to combine a plurality of sensors over the circumference of the pneumatic tire. If this plurality of sensors are connected in parallel, a plurality of significant measurements can be carried out on each wheel revolution. In this case, the evolution of the measured capacitance will take account of the successive deformations of a plurality of zones of the sidewall. The possible overlapping of different deformations may be taken into account by an appropriate signal processing.

Figure 8:
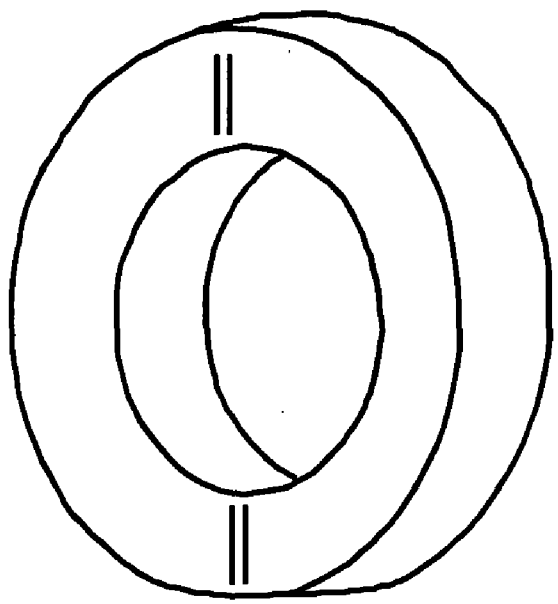
FIG. 8 is a schematic view of a tire instrumented according to the embodiment of FIG. 4 at two positions spread around the wheel.
Figure 9:
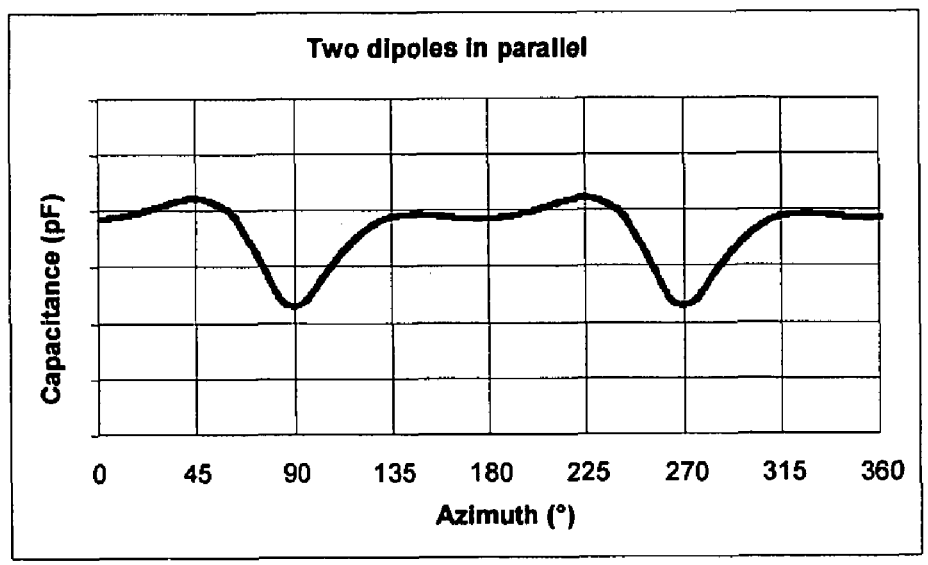
FIG. 9 is an experimental graph illustrating the evolution of the capacitance at the terminals of an electric dipole formed from two elementary electric dipoles connected in parallel and inserted in the sidewall of a tire according to FIG. 4, when the tire is rolling.

This combination is illustrated schematically in FIG. 8 in the case of two electric dipoles spread over the circumference of a sidewall. Each of the dipoles is configured according to the example of FIG. 4 and the set is connected in parallel. The graph of FIG. 9 shows the evolution of the capacitive impedance when the pneumatic tire is rolling in the same conditions as for FIG. 4b. It is noted that the signal corresponds well to the sum of two independent signals with hardly any overlapping in the case of two dipoles spread at 180° from each other around the wheel. However, this is merely a nonlimiting example, since it is also possible to connect a greater number of elementary dipoles and apply this same principle to other configurations, for example those of FIGS. 1 to 2c or that of FIG. 4.

It may also be beneficial, in order to improve the volume of data used by the processing of the signal, to instrument the two sidewalls of the pneumatic tire with one or more configurations of sensors according to the invention.

The device of the invention may be employed in the form of a device integrated in the pneumatic tire but also in the form of an independently produced element fixed on the pneumatic tire during production or subsequently.

The device of the invention may also be installed in an accessory of the pneumatic tire, such as an inner tube which is subjected to the deformations of the pneumatic tire.

The illustrations of the pneumatic tire are limited here to the application of the invention to the pneumatic tire, but as explained in the preamble of the present description, the invention applies similarly in other structures comprising an elastomeric body, such as, for example, the elastomeric joints intended for the chassis system of a vehicle.

Preferably, the geometrical dimensions of the wires constituting the electric dipoles should be small, namely wire diameters less than or equal to 1 mm, and wire lengths less than or equal to 1 cm, so that their insertion does not disturb the mechanical operation of the pneumatic tire too much.

To reduce the effect of external electromagnetic interference, which may possibly be the source of errors in the evaluation of the deformations, the device of the invention may also comprise an electromagnetic screen. This electromagnetic screen must be sufficiently electrically conductive, and its intrinsic electrical properties (conductivity, permittivity) sufficiently stable (mechanically and thermally), so as not to modify the electrical operation of the measurement means. The material constituting the electromagnetic screen must be sufficiently deformable so as not to modify the mechanical operation of the structure with which the device of the invention is associated.

What is claimed is:

1. Device for evaluating deformations in a tire, said device comprising a dipole having filar electrodes, the dielectric of said dipole being formed by an elastomeric body being subject to the deformations of the tire, said device comprising an electronic analyzing circuit sensitive to a variation of a capacitive characteristic measured between said filar electrodes of the dipole, said variation being caused by said deformations of said tire wherein the resistivity of said elastomeric body being greater than $10^{13}$ Ω.cm.

2. Device according to claim 1, further comprising means for evaluating forces to which said structure is subjected as a function of said deformations caused by said forces.

3. Device according to claim 1, said electrodes being substantially parallel.

4. A pneumatic tire in combination with a device for evaluating deformations in the tire, the device comprising a dipole having filar electrodes, the dielectric of the dipole being formed by an elastomeric body being deformable in response to tire deformations, the device comprising an electronic analyzing circuit sensitive to a variation of a capacitive characteristic measured between the filar electrodes of the dipole, the variation being caused by the tire deformations wherein the resistivity of said elastomeric body being greater than $10^{13}$ Ω.cm.

5. The pneumatic tire according to claim 4 further comprising means for evaluating forces to which said structure is subjected as a function of said deformations caused by said forces.

6. The pneumatic tire according to claim 4, said electrodes being substantially parallel to one another.

7. The pneumatic tire according to claim 6 wherein the tire comprises a tread, the dipole embedded within the tread.

8. The pneumatic tire according to claim 7 wherein the dielectric comprises a portion of the tread.

9. The pneumatic tire according to claim 7, wherein said device comprising two filar electrodes arranged substantially perpendicular to the longitudinal direction of the tread and substantially parallel to the transverse direction of the tread.

10. The pneumatic tire according to claim 9, wherein said filar electrodes are situated substantially in the same radial plane of the tread.

11. The pneumatic tire according to claim 7, wherein the filar electrodes comprise two filar electrodes arranged substantially perpendicular to a transverse direction of the tread and substantially parallel to a longitudinal direction of the tread.

12. The pneumatic tire according to claim 11, wherein the filar electrodes comprise at least three filar electrodes which constitute at least two dipoles.

13. The pneumatic tire according to claim 7, wherein said device comprises two filar electrodes situated in a zone of the tread arranged to be spaced from the ground when the pneumatic tire is rolling.

14. The pneumatic tire according to claim 4 wherein the tread includes tread blocks, the dipole being embedded in a tread block.

15. The pneumatic tire according to claim 6, wherein said device is situated in the tire sidewall.

16. The pneumatic tire according to claim 15 wherein said dielectric consists of the elastomeric material which constitutes said sidewall at least in the zone in which said dielectric is situated.

17. The pneumatic tire according to claim 15 wherein said dipole comprises electrodes which are substantially parallel to one another and oriented substantially radially.

18. The pneumatic tire according to claim 17 wherein said electrodes are substantially parallel to the sidewall and extend along a radius of the pneumatic tire, all of said electrodes being situated substantially at the same distance from the center plane of the pneumatic tire.

19. The pneumatic tire according to claim 17 wherein said electrodes are substantially parallel to one another and to the sidewall and extend along a radius of the pneumatic tire, each of said electrodes being spaced from one another in the direction of the thickness of the sidewall.

20. The pneumatic tire according to claim 17 wherein the electrodes consist of interdigitated combs.

21. The pneumatic tire according to claim 17, wherein a plurality of dipole elements are arranged along the circumference of the sidewall and are connected to one another in parallel to form the dipole.

* * * * *